INVENTORS
ROBERT P. DAVIE, JR.
EUGENE L. SPEARMAN, JR.
BY
William R. Lane
ATTORNEY Jan. 8, 1957   R. P. DAVIE, JR., ET AL   2,776,562
CONSTANT TEMPERATURE AIR SUPPLY
Filed Sept. 20, 1954   3 Sheets-Sheet 3

INVENTORS
ROBERT P. DAVIE, JR.
EUGENE L. SPEARMAN, JR.
BY
*William R. Lane*
ATTORNEY

United States Patent Office 2,776,562
Patented Jan. 8, 1957

2,776,562

CONSTANT TEMPERATURE AIR SUPPLY

Robert P. Davie, Jr., Manhattan Beach, and Eugene L. Spearman, Jr., North Hollywood, Calif., assignors to North American Aviation, Inc.

Application September 20, 1954, Serial No. 457,016

8 Claims. (Cl. 73—147)

This invention pertains to a constant temperature air supply means, and more particularly to an air supply means for a wind tunnel.

For present day testing the quantities of compressed air required for a wind tunnel become enormous. It is necessary to have a tunnel which provides a test section of reasonable size so that usable data can be obtained while permitting Mach numbers well into the supersonic range. In supplying a source of air in the quantities and pressures necessary for a supersonic wind tunnel it is customary to provide a tunnel of the blow-down type wherein an air storage tank or tanks can be charged with air at a predetermined high pressure, which air is then discharged through the wind tunnel for the test purposes. This type of tunnel materially reduces the power requirements for the air compressors compared with the tunnel whereby air would be constantly supplied from the compressors during the period of test.

Naturally when the air discharges from the storage tanks of a blow-down type of wind tunnel there will be a considerable drop in temperature as the air expands. However, for testing purposes it is necessary that the air supply means be substantially constant, or at least that it show very little drop in air temperature during the testing period. The air discharged from the storage tank of a blow-down tunnel, if not stabilized in some manner, would show an excessive temperature drop for satisfactory testing purposes. It has been proposed in the past to provide some sort of heat exchanger for raising the temperature of the air prior to its entry in the test section of the wind tunnel so that a supply of relatively constant temperature can be provided. This scheme has certain disadvantages. In the first place a heat exchanger offers a considerable resistance to the air flow thereby lowering the efficiency of the wind tunnel arrangement. Also, the heat exchanger is expensive to construct and to operate. One of the most severe limitations of a test set-up of this type is that the storage capacity of the tank is effectively reduced. This is because when the air expands upon discharge and attains a lower temperature its density will be considerably increased. The air remaining in the tank, therefore, at the end of the blow-down run will be cold, dense air which is of considerable weight for the amount of volume it displaces. The mass flow of air through the wind tunnel is thereby reduced when compared with the flow which could be obtained from a comparably dimensioned tank provided its end discharge temperature were higher.

Therefore it is an object of this invention to overcome the above enumerated disadvantages by providing a constant temperature air supply means which is economical, efficient and permits a maximum flow of air.

Another object of this invention is to provide an air supply means whereby air upon discharge from a storage tank is never appreciably lowered in temperature.

A further object of this invention is to provide an air supply means whereby the means for stabilizing the temperature of the air are disposed within an air storage tank.

Yet another object of this invention is to provide an air supply means whereby the temperature stabilizing means provides a minimum resistance to air flow.

These and other objects will become apparent from the following detailed description taken in connection with the accompanying drawings in which Fig. 1 is an overall schematic view of a wind tunnel arrangement;

Figure 1:
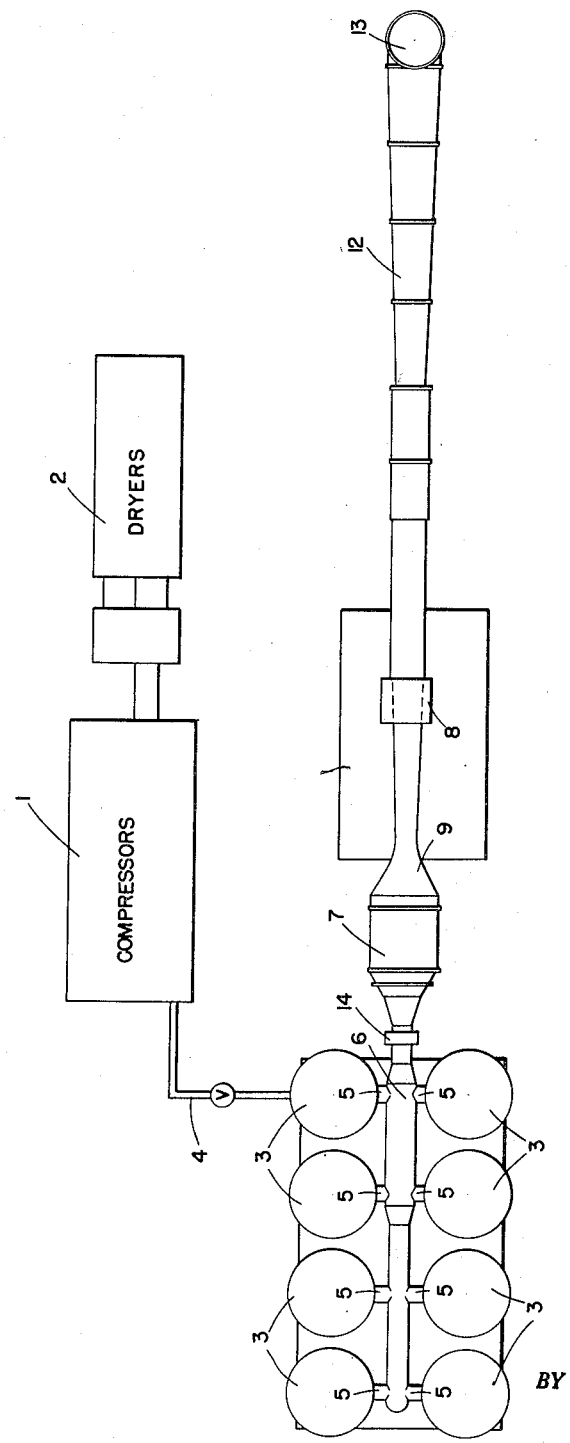

Referring to the drawing, a typical wind tunnel arrangement is indicated generally in Fig. 1. Such a system includes compressors 1 and air dryers 2 which, through connection 4, supply compressed dried air to a plurality of spherical storage tanks 3. The number and size of these tanks will depend upon the size of the tunnel and the pressure of the air will be governed by the Mach number which is to be obtained. Such a wind tunnel may, for example, have eight storage tanks, each of around 36 feet diameter and 200,000 cubic feet volume, to be pressurized to the neighborhood of ten atmospheres. Outlets 5 from the tanks lead to a common header 6 which empties into a plenum and approach section of the tunnel 7. Test section 8 includes a supersonic nozzle 9 which, in the example illustrated, is designed to provide velocities up to Mach 3.5 or greater. Following the test section the air discharges through diffuser 12 to the atmosphere at outlet 13. For a test arrangement, therefore, the compressors and driers are operated to charge the storage tanks with compressed air whereupon opening of valve 14 will allow the air from the tanks to discharge through the test section and diffuser to the atmosphere. In many instances it will be necessary to discharge all of the air at one time in such a manner that the tanks decrease in pressure from ten atmospheres to one atmosphere within a period of forty seconds. For a large spherical tank of this sort, air discharged in this manner reaches an end temperature very closely approximating that encountered for an adiabatic process. This means that with no provision for temperature stabilization, and for an initial air temperature of 80° F., a temperature drop in excess of 200° F. may be expected. This condition is indicated on curve A in Fig. 2 which is a graph of air temperature plotted against the time of discharge in seconds. Such a large temperature drop is of course prohibitive for satisfactory testing arrangements.

Figure 2:
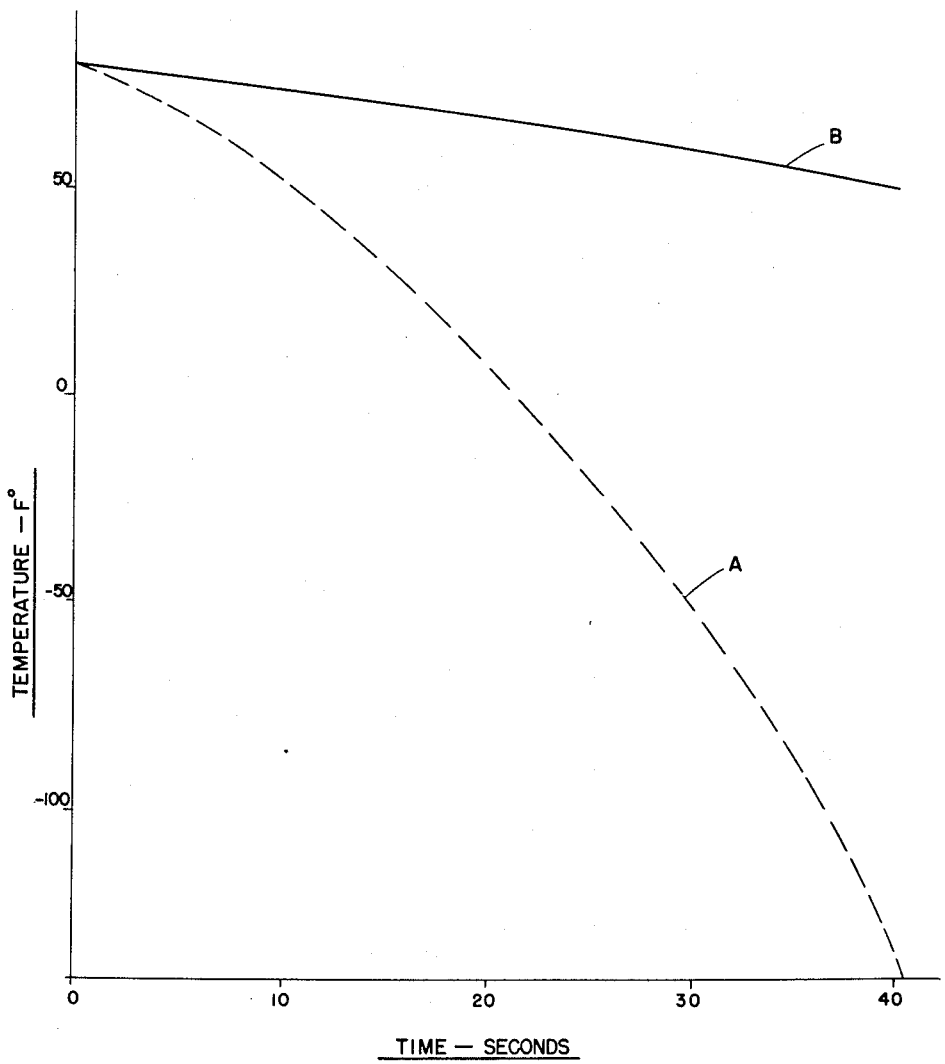
Fig. 2 is a graphical representation of air temperature drop against time of discharge.
Figure 3:
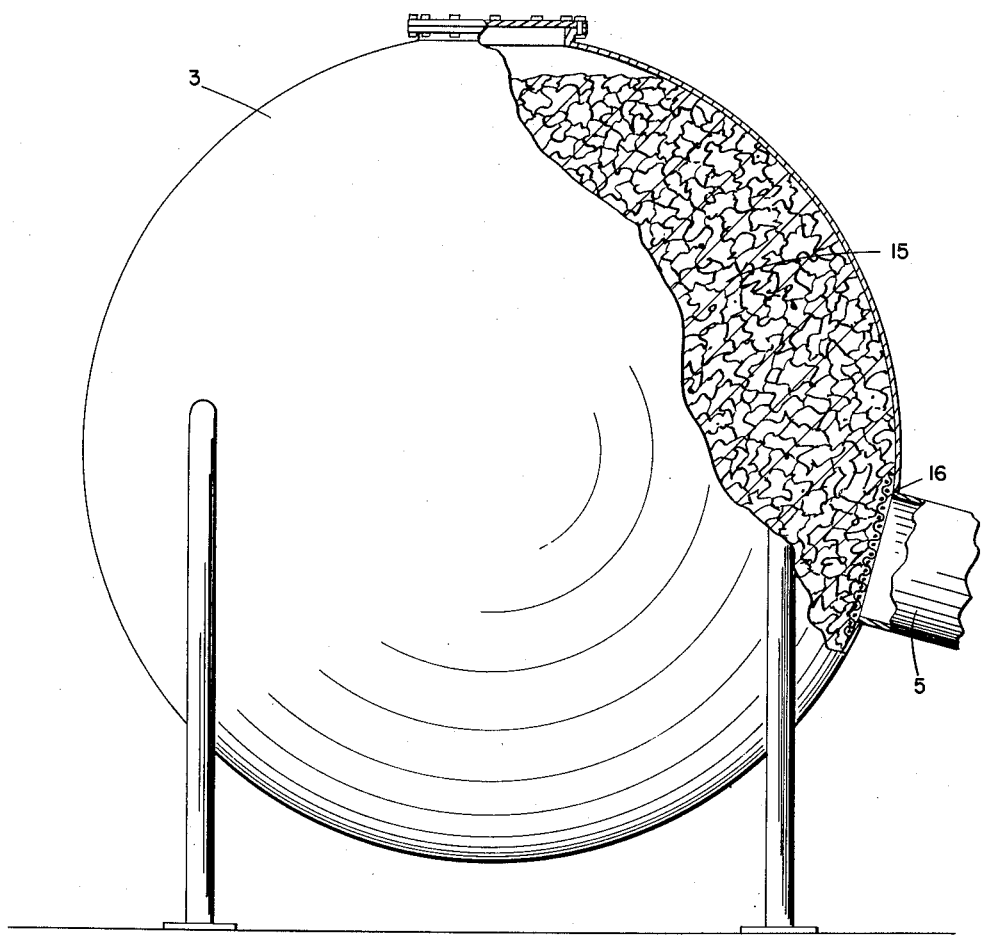
Fig. 3 is an elevational view, partially broken away of an air storage tank.
Figure 4:
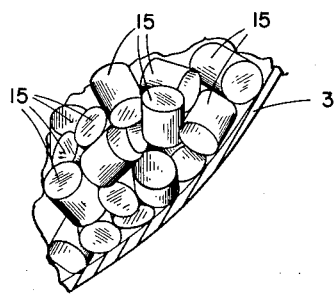
Fig. 4 is an enlarged fragmentary view illustrating the heat storage material.

By the provisions of this invention a heat storage material is provided within the tank which eliminates the excessive temperature drop as the air is discharged. The preferred embodiment of the heat storage arrangement is illustrated in Figs. 3 and 4. As shown in these figures the interior of the tank is substantially filled with a plurality of ordinary clean tin cans 15 randomly disposed therein. A can of this nature is of course usually constructed of steel with a tin plating thereon. The function of the cans is to store heat prior to the air discharge which is then transferred to the air as the air is expanded, thereby maintaining the air close to its original temperature. In Fig. 2 curve B illustrates the temperature drop which may be expected from the 200,000 cubic foot storage tank described when this tank is substantially filled with the heat storage medium 15. It can be seen that when the air is completely expanded the end temperature is only about 30° F. lower than the original temperature thereof.

It is possible to use materials other than the tin cans as the heat storage medium, the primary considerations being that the material exhibits a large surface area and provides considerable heat capacity. Other materials which may be successfully used are large aluminum shavings or turnings, a fibrous material such as steel wool, or crumpled sheet metal. In all of these examples the heat storage medium has considerable surface area and heat capacity. A fibrous material is desirable because of the very great surface area provided by each of the fibers thereof. It is important of course that the heat storage material is not of the type which will pack or mat down so as to obstruct the flow of air from the tank, or decrease the surface area presented. This obstruction will normally occur around screen 16 which is disposed over the outlet of the tank through which all of the air passes. The screen is necessary to prevent any material from passing from the tank to the wind tunnel and may be of ordinary construction of approximately one half inch mesh. If a material such as ordinary small metal shavings is used, considerable difficulty will be encountered from packing of the material around the screen which greatly retards the egress of air from the tank. The material 15, accordingly, should not decrease in density as the air is discharged.

A more ready understanding of the phenomonon occurring in the tank as the air is expanded, and the consequent requirements for material 15, can perhaps be attained by a brief consideration of the theromodynamic aspects involved. Naturally, if adiabatic expansion is to be avoided, and a higher final air temperature is to be obtained, a quantity of heat must be added to the air during its discharge from the tank. This heat which is supplied to the air to reduce its temperature drop comes from the heat storage material 15 disposed within the tank. Initially all of the contents of the tank will be at the same temperature, substantially that of the ambient air. Of course the pressurized air in the tank may be initially at a somewhat elevated temperature due to the work done in effecting its compression. Similarly, the heat storage material may have a slightly reduced temperature from having conducted heat to a charge of air previously in the tank. However, as the compressed air is retained within the tank the heat storage material and the air will stabilize at around ambient temperature because of the heat transmission through the tank walls. Subsequent expansion of the air as it begins to discharge will give it a lower temperature, so that a difference in temperature between the air and the heat storage material results. This temperature differential causes a heat transfer from the heat storage material to the air thereby reducing the air temperature drop. Such heat transmission between the heat storage material and the air follows the expression $$\frac{dQ}{dt} = hA\Delta T$$

where $\frac{dQ}{dt}$ = rate of heat transfer $h$ = heat transfer coefficient from the heat storage material to the air, $A$ = surface area of the heat storage material in contact with the air, and $\Delta T$ = temperature difference between the heat storage material and the air. Because of the fact that the transfer of heat from the heat storage material to the air will decrease the air temperature drop, and the loss of heat from material 15 will reduce its temperature from the initial value, the $\Delta T$ will be small at any given time during the expansion of the air from the storage tank. Material 15 and the air thereby seek the same temperature during the expansion process. Obviously, therefore, in order for the rate of heat transfer between the storage material and the air to be high so as to lessen the air temperature drop, it is necessary to provide a large surface area to compensate for the low value of $\Delta T$ in the above formula.

The quantity of heat which material 15 transfers to the air during the expansion process is expressed by the formula $$Q = WC_p(T_1 - T_2)$$

where $Q$ = quantity of heat transferred, $W$ = weight of the material, $C_p$ = specific heat of the material, $T_1$ = the initial temperature of the material, and $T_2$ = the final temperature of the material. This illustrates that if the decrease in temperature $(T_1 - T_2)$ of material 15 is to be kept low, the heat capacity of the material must be large. $T_2$, as previously noted, approximates the final air temperature, so that in general a large weight of material 15 will mean a high air temperature when the expansion is complete.

Therefore the properties necessary for the heat storage material are first that it has a large and unchanging surface area and a high heat capacity. Low resistance to air flow is also important and of course the material should be of low cost and ready availability. All of these desirable features can be realized by the use of ordinary tin cans as described. Each can, by virtue of its cylindrical shape, presents considerable surface area while the can structure is of sufficient weight so that collectively a large mass is provided. The specific heat of the tin plated steel is entirely adequate. There is no tendency of the cans to pack around the outlet screen and their resistance to the flow of air is quite low. Tin cans of course are readily available and relatively cheap. No problem of corrosion is realized when cans are used as the heat storage medium because the air which is pumped into these tanks is dried for testing purposes and is accordingly a non-corrosive atmosphere.

It has been found that whatever the heat storage material employed, it is preferable that this material substantially fills the entire volume of the tanks. When this is done the air temperature throughout the tank will never be lowered whereas if void areas are left in the tank the portion of air therein will drop in temperature as the air expands. It is possible to obtain reasonably good results with as high as 20% of the tank void of heat storage material provided this portion is disposed remote from the outlet of the tank. This will permit the air which has dropped in temperature in this void portion to be subsequently raised back up as it passes through the heat storage material to the outlet. Voids near the outlet, however, are prohibitive because reheating of the expanded air will not then occur. For optimum results it is preferred to substantially fill the tank with the heat storage material so that none of the air will be permitted to substantially drop in temperature.

The ability to maintain the discharge air from the storage tank at a substantially constant temperature and the economy of the means by which this is done, are actually not the only accomplishments of this invention. Of particular importance is the amount of volume saved by the use of a heat storage material within the tank itself as described. For the storage tank referred to, where it is pressurized to enable attainment of a Mach number of 3.5 in the wind tunnel, an actual saving of 30% in tank volume is realized compared with an arrangement wherein the tank has no stabilizing material. Because the air will be much more dense due to its lower temperature when no heat storage material is used, the weight of air remaining in the tank in such an event is much greater than that of the warmer air obtained with the present invention. Therefore, for a comparable quantity of air in the test section of the wind tunnel the storage tank would have to be in the order of 30% greater in volume than the tank described above, in other words being around 260,000 cubic feet compared with 200,000 cubic feet in capacity. Despite this, the cans themselves displace only around a negligible 2% of the total. Of course, great savings in space and cost are obtained from the use of smaller storage tanks.

The size and type of cans used are not critical. These may be in an assortment and either crushed or in original condition. Naturally no more than one end should be on each can so that its displaced volume will be low and the surface area presented high. The density of the cans, however, should be kept within certain limits depending upon the degree of temperature stability required. For the 30° temperature drop for a tank of 200,000 cubic feet as described, a density of 8.8 pounds of cans per cubic foot of tank volume is satisfactory. Higher density can be used if desired and lower densities will result in slightly less favorable temperature stability characteristics. A range of from five pounds per cubic foot to twenty pounds per cubic foot is regarded as encompassing the normal requirements of temperature stability.

It can be seen from the foregoing, therefore, that we have provided a temperature stabilizing arrangement for an air storage tank having considerable advantage over other known arrangements. The air temperature is never permitted to drop appreciably as the air expands but is maintained at a substantially constant value. The temperature stabilizing medium gives little resistance to air flow and is economical to provide. The heat storage material itself has a very low displaced volume while at the same time effecting a great saving in tank volume requirements. All of this is obtained by substantially filling the storage tank with tin cans, aluminum turnings, fibrous material or any such medium having a relatively large surface area and a high heat capacity.

The foregoing detailed description is to be clearly understood as given by way of illustration and example only, the spirit and scope of this invention being limited only by the appended claims.

We claim:

1. In a wind tunnel an air supply arrangement comprising an enclosed receptacle, a source of pressurized air connected therewith for charging said receptacle with pressurized air, an outlet for said receptacle connected with said wind tunnel, valve means in said outlet for controlling the flow therethrough, and a quantity of heat storage material of relatively large surface area and heat capacity disposed in said receptacle substantially filling the same including the portions of said receptacle surrounding said outlet, whereby when air is discharged from said receptacle heat is transferred thereto from said heat storage material and said air is precluded from appreciably dropping in temperature.

2. A relatively constant temperature air supply device comprising an enclosed receptacle, an outlet therefrom connected to a wind tunnel, means for charging said receptacle with pressurized air, a screen over said outlet, and a heat storage material of low displaced volume high surface area and large heat capacity disposed in said receptacle at substantially the temperature of such pressurized air for conducting heat to air in said receptacle upon sudden discharge of air from said receptacle.

3. A device as recited in claim 2 in which said heat storing material comprises a quantity of tin cans.

4. A relatively constant temperature air supply device comprising an enclosed receptacle, means for charging said receptacle with pressurized air, an outlet from said receptacle, valve means in said outlet for permitting rapid discharge of air from said receptacle, and a quantity of open-ended tin cans substantially filling said receptacle at a density of from approximately five pounds per cubic foot to twenty pounds per cubic foot for transmitting heat to air upon discharge of said receptacle and decreasing the temperature drop thereof.

5. An air storage and supply arrangement comprising an enclosed tank adapted to receive and hold air under pressure, said tank having outlet means for allowing rapid egress of air therefrom, and a heat storage material in said tank filling at least 80% of the space therein including all portions around said outlet, said heat storage material having a relatively large surface area and mass, a relatively constant density under air flow conditions in said tank, and a low displaced volume, whereby upon discharge of air through said outlet said heat storage material transmits heat to said air to decrease the temperature drop thereof.

6. A wind tunnel air supply arrangement comprising an air compressor and dryer assembly for providing compressed dried air, a plurality of substantially spherical storage tanks connected to said assembly for receiving and holding such air, each of said tanks having an outlet therefrom, said outlets merging into a common air supply header, said header being connected to a wind tunnel inlet, and valve means in said header for allowing rapid air discharge from said tanks, each of said tanks being provided with a heat storage medium therein for decreasing the drop in air temperature upon such rapid discharge of air, said heat storage medium comprising elements of relatively large surface area and heat capacity, and low displaced volume, randomly disposed in and substantially filling said tanks for transmitting heat to the air therein.

7. A relatively constant temperature wind tunnel comprising a source of compressed dried air, at least one storage tank connected therewith, an outlet for said storage tank, a nozzle connected to said outlet for receiving air therefrom, a test section connected to said nozzle, an outlet diffuser connected to said test section, a valve interposed between said nozzle and said storage tank for controlling the air flow from said tank and permitting a rapid discharge therefrom, and a heat storage medium of relatively large surface area and mass disposed entirely internally of said tank for transmitting heat to air in said tank upon such rapid discharge thereby reducing the temperature drop thereof, and supplying air of relatively constant temperature to said test section.

8. In a wind tunnel a relatively constant temperature air supply device comprising a receptacle, an outlet for said receptacle connected to said wind tunnel, valve means for controlling the flow through said outlet, means for charging said receptacle with pressurized air, and means for preventing air discharged through said outlet from approaching an adiabatic temperature drop, said means including a heat storage material capable of being stabilized at substantially the temperature of the air within said receptacle, said heat storage material having a relatively large mass and surface area and a relatively low displaced volume.

References Cited in the file of this patent

UNITED STATES PATENTS

| | | |
|---|---|---|
| 1,465,955 | Sturcke | Aug. 28, 1923 |
| 2,244,612 | Crowley | June 3, 1941 |
| 2,635,990 | Goins | Apr. 21, 1953 |
| 2,713,266 | Smith et al. | July 19, 1955 |

OTHER REFERENCES

N. A. T. O. "Design and Operation of Intermittent Supersonic Wind Tunnels" by A. Ferri et al., May 1954, pp. 19, 20, 21, 52, 53, 108; copy in class 73–147.